United States Patent Office 3,202,657
Patented Aug. 24, 1965

3,202,657
N-ARALKYL- AND N-ARYL DERIVATIVES OF TETRAHYDRO - OXATHIAZINE-(1,4,5)-DIOXIDE-(4,4) AND PROCESS FOR PREPARING THEM
Rudolf Kühne and Fritz Meininger, Frankfurt am Main, and Rolf Wilhelm Pfirrmann, Heidelberg, Germany, assignors to Farbwerke Hoechst Aktiengesellschaft vormals Meister Lucius & Brüning, Frankfurt am Main, Germany, a corporation of Germany
No Drawing. Filed Nov. 27, 1962, Ser. No. 240,437
Claims priority, application Germany, Nov. 30, 1961, F 35,442
9 Claims. (Cl. 260—243)

The present invention relates to novel heterocyclic compounds and to a process for preparing them; more particularly it relates to novel heterocyclic compounds of the general formula

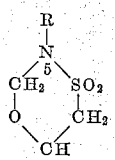

wherein R represents an alkyl, cycloalkyl, aralkyl or aryl radical which may be substituted.

We have found that heterocyclic compounds of the general formula

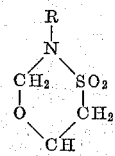 (1)

wherein R represents an alkyl, cycloalkyl, aralkyl or aryl radical which may be substituted, can be prepared by reacting a compound of the general formula

 (2)

wherein R has the above meaning and X represents a hydrogen atom or the radical of a mono- or polybasic acid with formaldehyde in the presence of a moderately strong to strong acid and, if desired, in the presence of an organic solvent.

The radical R in the above formula may represent, for example, a methyl, ethyl, propyl, butyl, cyclohexyl, methylcyclohexyl, benzyl, phenyl, nitrophenyl, carbethoxyphenyl, methylphenyl, chloro-nitro-phenyl, dimethyl-nitro-phenyl or naphthyl radical.

The radical X, if representing the radical of a mono- or polybasic acid, may be, for example, a formic acid, acetic acid, methane-sulfonic acid, p-toluene-sulfonic acid, benzoic acid, phosphoric acid or, especially, the sulfuric acid radical.

As moderately strong or strong acids, which in the process of the present invention act as agent causing cyclization, there may be used such acids which have a dissociation constant of at least $10^{-4}$ (with polybasic acids the minimum value relates to the first step of dissociation) as, for example, diluted mineral acids, such as sulfuric acid, hydrochloric acid, phosphoric acid or strong organic acids, such as formic acid.

The reaction may be carried out in an aqueous phase as well as in an organic solvent as, for example, tetrahydrofurane, benzene, nitrobenzene, or in a mixture of an organic solvent and water; the reaction proceeds particularly well, when using as solvent a strong organic acid, advantageously formic acid, which simultaneously acts as agent causing cyclization.

The formaldehyde is generally used in the form of its aqueous solution; para-formaldehyde dissolved in an organic solvent, however, is equally suitable.

In the process of the present invention the reaction is carried out at temperatures of about 20° to 120° C. depending on the kind of the starting material used. Generally, the molar ratio of the two reaction components is at least 1:1; it is, however, advisable in most cases to work with an excess of formaldehyde. The formaldehyde, for example, may be used in a molar excess of formaldehyde. The formaldehyde, for example, may be used in a molar excess of 1:10 or even in a higher molar excess. The reaction period is about 30 to 200 minutes, preferably about 60 minutes; in special cases, however, shorter or longer reaction periods may also be advantageous. The reaction, catalyzed by means of acid, takes place via the N-substituted β-hydroxyethyl-sulfonylamine which may easily be formed under the reaction conditions mentioned from the corresponding esters having the general formula indicated above (2) and which stabilizes via the semi-acetal, which is not obtained otherwise, with subsequent splitting off of water to give a heterocycle according to the following formula scheme

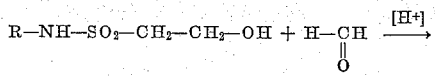

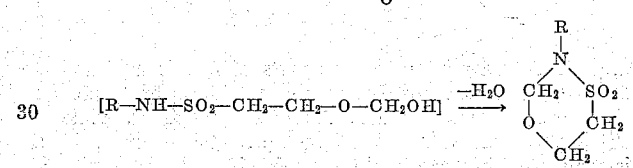

The sulfonamides having the general formula

which may be used as starting material in the process of the present invention can be prepared, for example, by reacting primary organic amines with carbyl sulfate (this compound being a heterocyclic compound having the formula

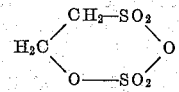

in an aqueous medium or in an organic solvent in the presence of an acid-binding agent. The novel compounds may be referred to as tetrahydro-oxathiazine-(1,4,5)-dioxide-(4,4) derivatives. The radical R of the novel compounds may be substituted subsequently, or the substituents may be transformed into others.

The novel heterocyclic compounds may be used as intermediate products for the preparation of dyestuffs.

The following examples serve to illustrate the invention, but they are not intended to limit it thereto, the parts and percentages being by weight unless otherwise stated and the relationship of parts by weight to parts by volume being the same as that of the kilogram to the liter.

EXAMPLE 1

N-(n-hexyl)-tetrahydro-oxathiazine-(1,4,5)-dioxide-(4,4)

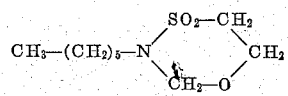

19 parts of the compound having the formula

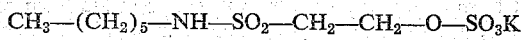

are introduced into a mixture of 100 parts of formic acid and 15 parts of an aqueous formaldehyde solution of 30 percent strength. The reaction mixture is heated at the boil for 1 hour; subsequently the solvent is removed by distillation in vacuo. The residual, oily product is washed with water and purified by distillation in vacuo. There is obtained an oil with good yield which boils at 124° to 126° C. (0.13 mm.) and which solidifies at 3 to 3.4° C. in the form of colorless crystals.

EXAMPLE 2

N-(benzyl)-tetrahydro-oxathiazine-(1,4,5)-dioxide-(4,4)

166.5 parts of the compound having the formula

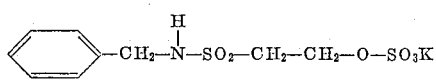

1000 parts of formic acid and 150 parts of an aqueous formaldehyde solution of 30 percent strength are heated at the boil for 3 hours, while stirring. Subsequently the formic acid is distilled off in vacuo, and the residual, semisolid product is crystallized by mixing with water. The precipitate is filtered off with suction, washed with water until neutral and recrystallized from water or alcohol. The substance precipitates with excellent yield in the form of felted, colorless needles which melt at 103° C.

EXAMPLE 3

N-(4'-methylphenyl)-tetrahydro-oxathiazine-(1,4,5)-dioxide-(4,4)

116.5 parts of the compound having the formula

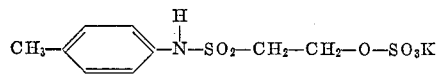

are added to a mixture of 600 parts of formic acid and 50 parts of an aqueous formaldehyde solution of 30 percent strength and heated at the boil for 1 hour, while stirring. After the reaction is complete the formic acid is evaporated in vacuo and the residue is washed out with water. By recrystallization from aqueous alcohol the compound is obtained with good yield in the form of coarse, prismatic crystals which melt at 70° to 71° C.

EXAMPLE 4

N-(4'-carbethoxyphenyl)-tetrahydro-oxathiazine-(1,4,5)-dioxide-(4,4)

117 parts of the benzene derivative having the constitution

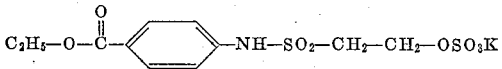

500 parts of formic acid and 50 parts of an aqueous formaldehyde soltuion of 30 percent strength are stirred for 2 hours at 90° C. 200 parts of water are added to the clear reaction solution, and the the whole is concentrated subsequently in vacuo. The semisolid residue is mixed with water, filtered off and recrystallized repeatedly from methanol. The crystalline, colorless compound obtained with good yield melts at 103° to 104° C.

EXAMPLE 5

N-(4'-nitrophenyl)-tetrahydro-oxathiazine-(1,4,5)-dioxide-(4,4)

364 parts of the compound having the formula

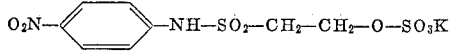

are heated at the boil for 2 hours with 1000 parts of formic acid and 200 parts of an aqueous formaldehyde solution of 30 percent strength. After the reaction is complete, the mixture is diluted with 400 parts of water. After a short time the product crystallizes in the form of brilliant, colorless lamellae. The compound obtained with excellent yield can be purified by recrystallization from aqueous dioxane. The melting point is between 204° and 205° C.; the yield is about 90%.

The product is obtained with similarly good yield, when using instead of formic acid 600 parts of phosphoric acid of 80 percent strength or instead of the above-mentioned starting material one of the compounds having the following constitution:

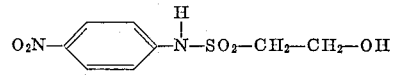

or

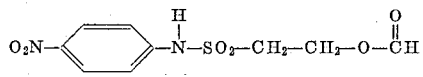

From the N-(4'-nitrophenyl)-tetrahydro-oxathiazine-(1,4,5)-dioxide-(4,4) there may be prepared by catalytic hydrogenation or by other reduction methods usually applied the N-(4'-aminophenyl)-tetrahydro-oxathiazine-(1,4,5)-dioxide-(4,4). The amine crystallizes from water in the form of colorless needles which melt at 138° C.

EXAMPLE 6

N-(4'-nitro-3'-chlorophenyl)-tetrahydro-oxathiazine-(1,4,5)-dioxide-(4,4)

399 parts of the compound

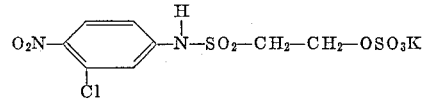

are reacted with an aqueous formaldehyde solution under the conditions described in Example 5. The tetrahydro-oxathiazine-dioxide derivative can be isolated with a good yield and can be recrystallized from butanol. There are obtained weakly yellowish crystals which melt at 129° C.

EXAMPLE 7

N-(4'-chloro-3'-nitrophenyl)-tetrahydro-oxathiazine-(1,4,5)-dioxide-(4,4)

210 parts of carbyl sulfate and a solution fo 100 parts of triethylamine and 100 parts by volume of nitrobenzene are introduced simultaneously into a solution of 173 parts of 4-chloro-3-nitro-aniline and 300 parts by volume of nitrobenzene, while stirring. After 2 hours 500 parts of formic acid and 150 parts of an aqueous formaldehyde solution of 30 percent strength are added to the mixture, and the whole is stirred for another 2 hours at 95° C. Subsequently the solvent is distilled off in vacuo, and the residue is mixed with water and filtered off. The tetrahydro-oxathiazine derivative can be purified by recrystallization from butanol. It precipitates with good yield in the form of weakly yellow crystals melting at 131° C.

EXAMPLE 8

N-(3'-nitrophenyl)-tetrahydro-oxythiazine-(1,4,5)-dioxide-(4,4)

364 parts of the compound

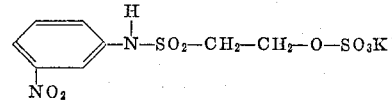

are reacted with an aqueous formaldehyde solution as described in Example 5. The reaction product is obtained with excellent yield in the form of colorless, brilliant crystals which after recrystallization from methanol melt at 134.5° C.

EXAMPLE 9

N-(4'-benzophenone)-tetrahydro-oxathiazine-(1,4,5)-dioxide-(4,4)

41 parts of the benzophenone derivative having the following constitution

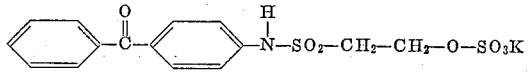

are heated at the boil for 2 hours with 10 parts of an aqueous formaldehyde solution of 30 percent strength and 150 parts of formic acid. The reaction product is then precipitated by the addition of 200 parts of water, filtered off and washed with water. After recrystallization from methanol there are obtained colorless crystals which melt between 127° and 128° C.

EXAMPLE 10

*N-(2',5'-dimethyl-4'-nitrophenyl)-tetrahydro-oxathiazine-(1,4,5)-dioxide-(4,4)*

392 parts of the compound having the following constitution

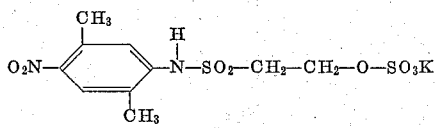

are reacted with formaldehyde as described in Example 5. After the working-up the tetrahydro-oxathiazine-dioxide derivative is obtained with very good yield. After recrystallization from butanol the praduct melts at 141° C.

EXAMPLE 11

*N-(3'-methyl-4'-nitro-6'-methoxyphenyl)-tetrahydro-oxathiazine-(1,4,5)-dioxide-(4,4)*

408 parts of the compound

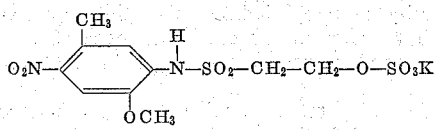

are reacted with formaldehyde as described in Example 5 to give the tetrahydro-oxathiazine-dioxide derivative in very good yield. By recrystallization from butanol there are obtained colorless needles which melt at 172° C.

EXAMPLE 12

*N-[4'-(phenyl-azo-phenyl)]-tetrahydro-oxathiazine-(1,4,5)-dioxide-(4,4)*

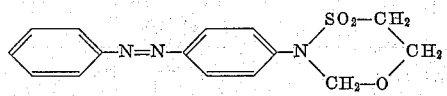

40.7 parts of the azobenzene derivative having the following constitutiion

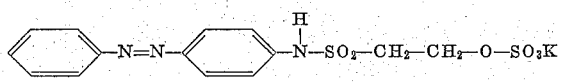

20 parts of formaldehyde solution of 30 percent strength and 100 parts of formic acid are heated at the boil for 2 hours. The reaction product is precipitated by means of water and recrystallized from aqueous alcohol. The tetrahydro-oxathiazine-oxide derivative is isolated with good yield in the form of weakly orange lamellae which melt at 132° C.

EXAMPLE 13

*N-(2'-naphthyl)-tetrahydro-oxathiazine-(1,4,5)-dioxide-(4,4)*

37 parts of the compound

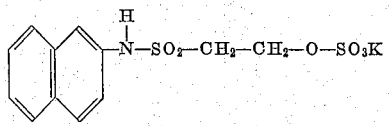

are stirred for 1 hour at 90° C. with 15 parts of an aqueous formaldehyde solution of 30 percent strength and 200 parts of formic acid. Subsequently the reaction product is precipitated by diluting with water, filtered off with suction and recrystallized from butanol. There are obtained colorless crystals which melt between 115 and 116° C.

EXAMPLE 14

*N-phenyl-tetrahydro-oxathiazine-(1,4,5)-dioxide-(4,4)*

50 parts of the compound

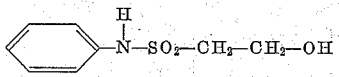

are allowed to stand for 24 hours at room temperature with 250 parts of formic acid and 25 parts of an aqueous formaldehyde solution of 30 percent strength. Subsequently the clear reaction solution is diluted with 300 parts of water. After a short time the tetrahydro-oxathiazine-dioxide derivative crystallizes in the form of colorless crystals. The compound obtained with good yield can be purified by recrystallization from water. The melting point is between 94° and 95° C.

EXAMPLE 15

*N-(3'-chlorophenyl)-tetrahydro-oxathiazine-(1,4,5)-dioxide-(4,4)*

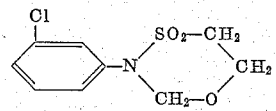

160 parts of the potassium salt of N-ethionyl-3-chloroaniline are stirred for 2½ hours at 91° to 92° C. together with 1000 parts of 2 N-hydrochloric acid. After cooling to room temperature 100 parts of an aqueous formaldehyde solution of 30 percent strength are added and the suspension is stirred for 48 hours. The reaction product separates at the bottom in the form of a resin so that the aqueous mother liquor can easily be poured off. The resin crystallizes from alcohol. After recrystallizing once from alcohol, there is obtained a crystalline, colorless compound with good yield which melts at 94° C.

EXAMPLE 16

*N-(3',4'-dichlorophenyl)-tetrahydro-oxathiazine-(1,4,5)-dioxide-(4,4)*

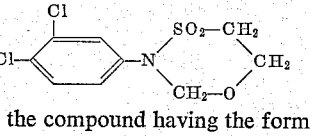

354 parts of the compound having the formula

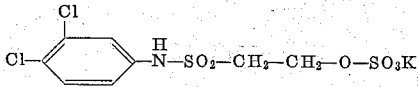

are reacted with formaldehyde and formic acid under the conditions described in Example 5. After recrystallization from alcohol there are obtained with a yield of more than 90%, colorless, coarse prisms which melt at 146° C.

EXAMPLE 17

*N-(4'-nitrobenzyl)-tetrahydro-oxathiazine-(1,4,5)-dioxide-(4,4)*

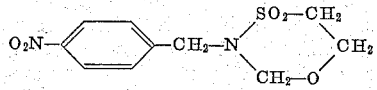

By the reaction of 4-nitrobenzylamine and carbyl sulfate and subsequent treatment of the reaction product with formaldehyde and formic acid as described in Example 5 there may be obtained the 4-nitro-benzyl derivative with good yield. After recrystallization from alcohol there are obtained colorless crystals which melt at 143° to 144° C.

The same compound is obtained by nitration of the N-(benzyl)-tetrahydro-oxathiazine - (1,4,5) - dioxide - (4,4) with fuming nitric acid at 0° to 5° C.

By catalytic hydrogenation of the nitro compound there is formed the N-(4'-aminobenzyl)-tetrahydro-oxathiazine-(1,4,5)-dioxide-(4,4), which after recrystallization from water melts at 199° to 200° C.

EXAMPLE 18

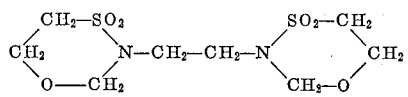

51 parts of the compound having the formula

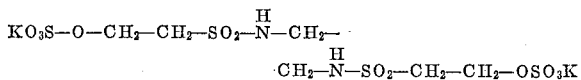

obtained by the reaction of ethylenediamine and carbyl sulfate and subsequent neutralization with $KHCO_3$, and 200 parts by volume of formic acid and 9.3 parts of paraformaldehyde are heated at the boil for 30 minutes. The formic acid is then distilled off in vacuo, and the residue is recrystallized from water. There are obtained with good yield colorless needles which melt at 210° C. under decomposition.

EXAMPLE 19

24.6 parts of the compound

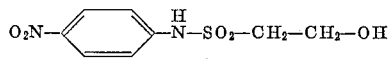

and 100 parts by volume of tetrahydrofuran and 6 parts of paraformaldehyde and 10 parts by volume of phosphoric acid of about 70 percent strength are boiled under reflux for 30 minutes. The solvent is then distilled off in vacuo, and the residue is recrystallized from aqueous dioxan. The yield of N-(4'-nitrophenyl)-tetrahydro-oxathiazine - (1,4,5) - dioxide - (4,4,) exceeds 90% of the theory.

EXAMPLE 20

95 parts of an aqueous paste of 40.4 percent strength of 4-bromo-1-amino-anthraquinone-2-sulfonic acid, and 34.2 parts of N-(4'-aminophenyl)-tetrahydro-oxathiazine-(1,4,5)-dioxide-(4,4), prepared by catalytic hydrogenation of N-(4'-nitro-phenyl)-tetrahydro-oxathiazine-(1,4, 5)-dioxide-(4,4) as described in Example 5, 4 parts of sodium carbonate, 62 parts of sodium bicarbonate and 1 part of copper (I)-chloride in 500 parts of water are stirred for 3 hours at 80° C. The blue dyestuff formed is precipitated by the addition of sodium chloride, filtered off and dried. There are obtained 43 parts of a dyestuff having the formula

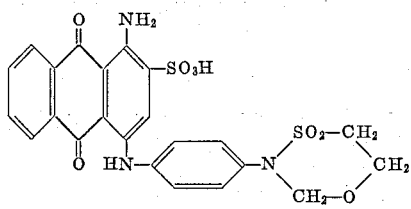

This powder is dissolved in 1000 parts of water, 31 parts of sodium dithionite are added, and the whole is heated for 20 minutes at 90° to 100° C. The solution is then neutralized with sodium carbonate. The color of the solution changes from yellow into blue, and the dyestuff precipitates. After cooling to room temperature the dyestuff is filtered off, washed with water and dried in vacuo.

There are obtained 32 parts of a dark powder which, after having been brought into a finely divided form in a swing mill, dyes fibers of polyethylene terephthalate in reddish blue tints, when treated according to the high temperature process. The dyeings possess a good fastness to washing, to light and, particularly, to thermofixation.

EXAMPLE 21

23 parts of N-(4'-aminophenyl)-tetrahydro-oxathiazine-(1,4,5)-dioxide-(4,4) obtained by catalytic hydrogenation of N-(4'-nitro-phehyl)-tetrahydro-oxathiazine-(1,4, 5)-dioxide-(4,4) as described in Example 5, are diazotized at 0° to 5° C. in a mixture of 200 parts of ice water and 24 parts of concentrated hydrochloric acid with 20 parts by volume of 5 N-sodium nitrite solution.

After the diazotization is complete, the diazo solution is adjusted to a pH-value of 5 to 6 by the addition of sodium bicarbonate; the diazo solution is then added dropwise to a solution of 10.8 parts of p-cresol in 100 parts by volume of 2 N-sodium hydroxide solution and 40 parts by volume of dimethylformamide. After the coupling is complete the dyestuff formed having the formula

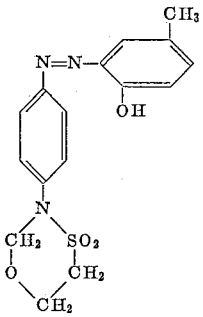

is separated completely by introducing potassium chloride.

The dyestuff is filtered off, purified by dissolution in 400 parts by volume of dimethyl formamide and represcipated by the addition of water. The purified dyestuff is filtered off and dried in vacuo. There is obtained a yellow powder which, after having been brought into a finely divided form in a swing mill, dyes fibers and fabrics of polyethylene terephthalate yellow tints when applying the high temperature or carrier process. The dyeings possess a good fastness to washing, light and thermofixation.

The following table contains the diazo and coupling components of further azo-dyestuffs which may be obtained in an analogous manner as described above as well as the tint of the dyeings obtainable with these azo-dyestuffs on polyethylene terephthalate fibers:

| Diazo component | Coupling component | Tint of the dyeing on polyethylene terephthalate |
|---|---|---|
| ![NH2 group with phenyl ring, N-CH2-SO2-O-CH2-CH2 ring] | ![(→)—pyrazole with CH3, HO, N, phenyl] | Greenish yellow. |
| ![CH2-phenyl-NH2 with N-CH2-SO2-O-CH2-CH2 substituent] | ![(→)—phenyl with CH3 and OH] | Yellow. |
| ![NH2-phenyl-Cl with N-CH2-SO2-O-CH2-CH2 substituent] | ![(→)—phenyl with CH3, Cl and N(CH3)2] | Reddish yellow. |

The diazo components listed in the table are obtained by catalytic hydrogenation from the corresponding nitro compounds. The arrows (→) indicate the places where coupling takes place.

We claim:
1. A heterocyclic compound selected from the group consisting of compounds having the formula

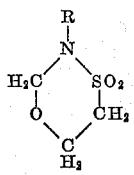

wherein R represents a member of the group consisting of benzyl, phenyl, methyl-phenyl, carbethoxy-phenyl, nitro-phenyl, amino-phenyl, nitro-chlor-phenyl, dimethyl-nitro-phenyl, methyl-nitro-methoxy-phenyl, benzoyl-phenyl, phenyl-azo-phenyl and naphthyl.

2. A process for preparing heterocyclic compounds having the formula

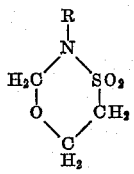

wherien R represents a member of the group consisting of benzyl, phenyl, methyl-phenyl, carbethoxy-phenyl, nitro-phenyl, nitro-chlor-phenyl, dimethyl-nitro-phenyl, methyl-nitro-methoxy-phenyl, benzoyl-phenyl, phenyl-azo-phenyl and naphthyl which comprises reacting a sulfonamide having the formula

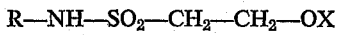

R—NH—SO$_2$—CH$_2$—CH$_2$—OX wherein R is as defined above and X is a member of the group consisting of hydrogen, —SO$_3$H, —SO$_3$K, —PO$_3$H$_2$ and —CHO with formaldehyde in the presence of an acid selected from the group consisting of formic acid and diluted mineral acids at a temperature in the range of about 20° C. to about 120° C., the molar ratio of said sulfonamide and formaldehyde being in the range of about 1:1 to 1:10.

3. The heterocyclic compound having the formula

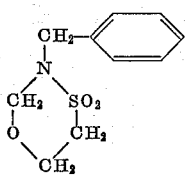

4. The heterocyclic compound having the formula

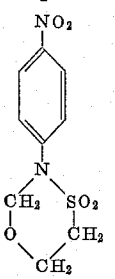

5. The heterocyclic compound having the formula

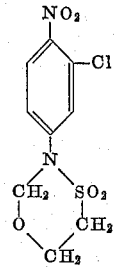

6. The heterocyclic compound having the formula

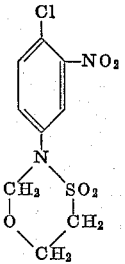

7. The heterocyclic compound having the formula

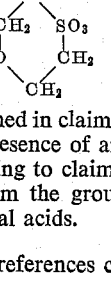

8. A process as claimed in claim 2, wherein the reaction is carried out in the presence of an inert organic solvent.

9. A process according to claim 2 wherein said acid is a member selected from the group consisting of formic acid and diluted mineral acids.

No references cited.

WALTER A. MODANCE, *Primary Examiner.*

NICHOLAS S. RIZZO, *Examiner.*